United States Patent [19]

Rosenbaum

[11] 3,932,102

[45] Jan. 13, 1976

[54] SPIRAL DESIGN PIPEHEAD

[75] Inventor: Larry A. Rosenbaum, Marion, Ohio

[73] Assignee: Koehring Company, Milwaukee, Wis.

[22] Filed: Nov. 1, 1974

[21] Appl. No.: 520,357

[52] U.S. Cl. ............................. 425/466; 425/197
[51] Int. Cl.[2] ......................................... B29D 23/00
[58] Field of Search ............ 425/67, 197, 380, 461, 425/464, 466, 467

[56] References Cited
UNITED STATES PATENTS

| | | | |
|---|---|---|---|
| 3,193,879 | 7/1965 | Corbett | 425/461 |
| 3,270,371 | 9/1966 | Schiedrum et al. | 425/467 |
| 3,491,406 | 1/1970 | Davidson | 425/466 |
| 3,533,134 | 10/1970 | Blomqvist | 425/197 |
| 3,689,192 | 9/1972 | Upmeier | 425/467 |
| 3,809,515 | 5/1974 | Farrell | 425/467 |

*Primary Examiner*—Al Lawrence Smith
*Assistant Examiner*—James G. Smith
*Attorney, Agent, or Firm*—Andrew J. Beck

[57] ABSTRACT

A pipehead for an extruder includes a die body and a die pin having a central bore, a plurality of radial ports, and a corresponding plurality of helical grooves with a region of decreasing depth. The helical grooves are located at the blind end of an annular channel having a constricted area and terminating in a die opening. The channel is defined by the die body and the die pin. A breaker plate having a multiplicity of openings may be provided downstream of the grooves to generate a multiplicity of filament-like streams that are subsequently recombined as they pass through the constriction of the annular channel. The diameter of the annular channel generally decreases axially along the head. The pipehead is provided with internal and external heating means for temperature control.

13 Claims, 6 Drawing Figures

FIG. 2
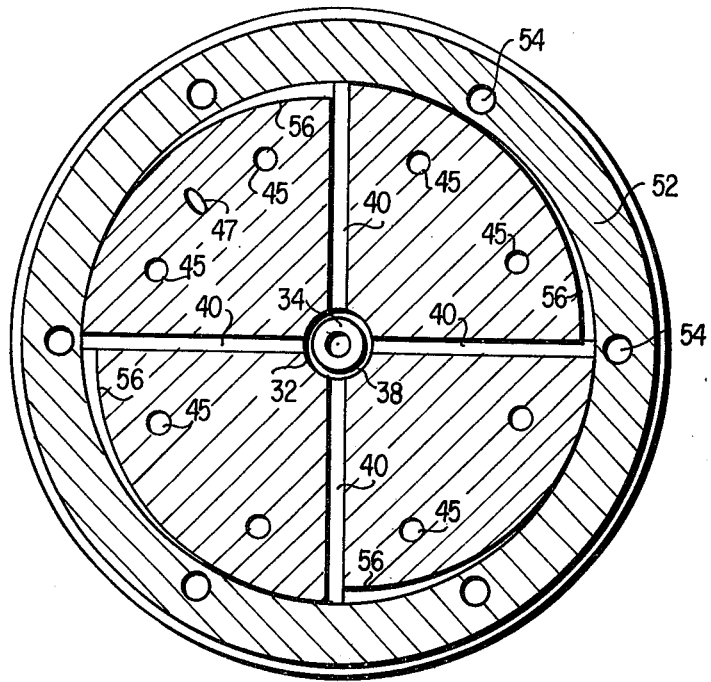
FIG. 3
FIG. 4
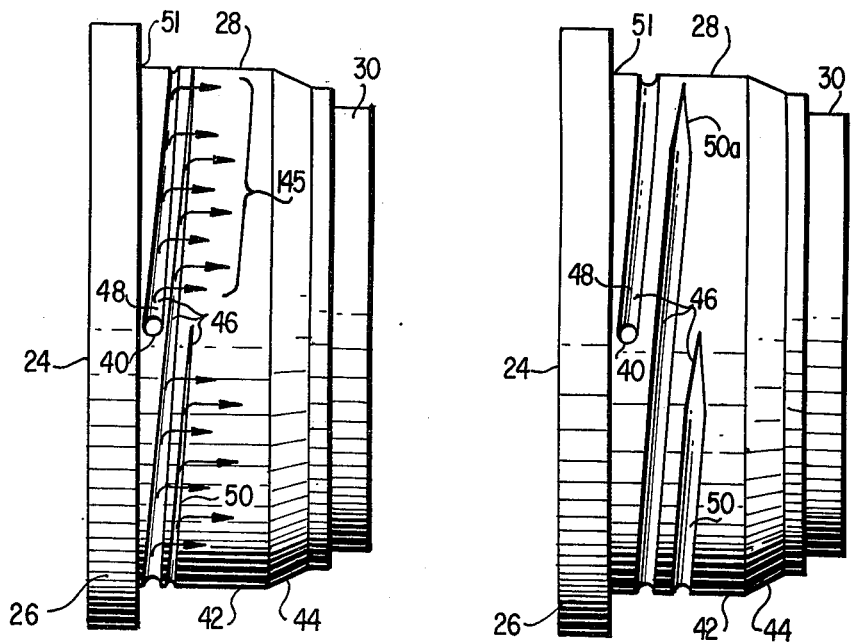

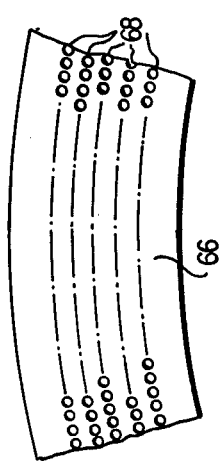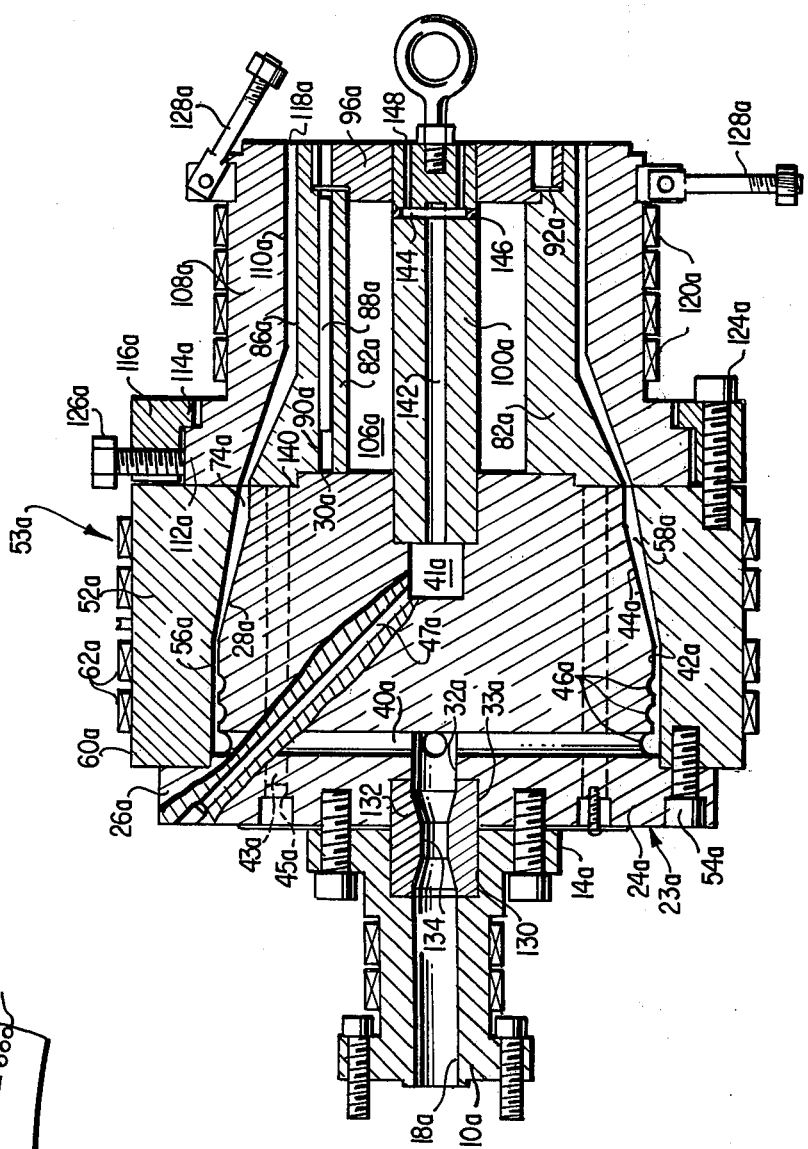

SPIRAL DESIGN PIPEHEAD

BACKGROUND OF THE INVENTION

This invention relates generally to heads for extruders. More particularly, this invention is concerned with a head for extruding hollow thick-walled cylindrical articles of indefinite length from plasticized synthetic resinous materials.

During the extrusion of hollow cylindrical articles of indefinite length, such as pipe, weld lines frequently occur in the finished article. Such weld lines are not indications of welding in the classical sense of the word, but result from the flow of plasticized polymeric material around streamline bodies in conventional spider pipeheads. The streamline bodies radially cut the material flow and have a tendency to align polymeric chains in the direction of material flow. As the flow recombines downstream of each streamline body, adhesion must be obtained between radially aligned surfaces.

Many polymeric materials do not readily adhere and recombine after having been cut. This property in combination with partially aligned polymeric chains results in non-isotropic structural properties of a finished article in addition to visual imperfections in the surface thereof.

Many other polymeric materials do readily adhere and recombine after being cut. However, for these materials the weld lines are actually visual imperfections in the finished article and, in many applications, it is highly desirable to avoid and eliminate the presence of such visual imperfections.

Another problem, frequently encountered in the extrusion of large diameter pipe, concerns the physical mass and weight of the pipehead assembly. Conventionally, spider designs are used for extrusion of large diameter pipes. As a result of high extrusion pressures in the plasticized material and the large surface areas internally of the pipehead, substantial forces are acting to separate parts of the pipehead. These forces necessitate large and heavy parts to withstand the fluid pressure developed during the extrusion process.

In the past it has been proposed to design a pipehead so as to overcome the problems usually associated with the conventional spider designs. One such pipehead, illustrated by U.S. Pat. No. 3,270,371 to Schiedrum et al., includes a confined helical channel of constant cross-sectional area that spirals radially outwardly to an annular distributing channel from which a pipe is extruded. However, this proposal is believed to be of limited practical utility as far as commercial operations are concerned.

In commercial applications, tolerance to variations in throughput rate, the particular polymeric material used and melt temperature is necessary, since pipes of different materials are often extruded with the same pipehead. Also, in most commercial applications, it is desirable and frequently a practical necessity to have a finished product with isotropic structural properties. Moreover, since polymeric materials exhibit poor pressure transmitting features, pipeheads which supply a plenum by a single channel frequently exhibit a poor circumferential pressure distribution at the extrusion orifice.

The general problem of transforming a solid cylindrical flow of plastic material into a uniform annular flow has also been the subject of various proposals in the field of blowing plastic films. See, for example, U.S. Pat. No. 3,689,192 to Upmeier, where a horizontal stream entering the periphery of a vertically oriented blowhead is split into circumferential streams which enter helical channels with decreasing depth. Aside from the basic unsuitability of the vertical blowhead devices for use in the extrusion of pipe, this construction is believed incapable of accommodating the variables necessarily incident to practical pipe making operations.

Where material may flow from an upstream portion of one channel over a downstream portion of another channel, a radially laminated wall construction occurs which may be free from weld lines. However, if the throughput rate, temperature or polymeric material, varies, the helical channel empty earlier or later thereby developing a weld line which corresponds to the end of the channel. Moreover, where material discharged from a few channels is promptly discharged from an extrusion orifice, a pressure maldistribution is likely to occur.

BRIEF SUMMARY OF THE INVENTION

It is, therefore, a general object of this invention to provide a novel pipehead for thick-walled articles which alleviates problems of the type previously noted.

In a preferred embodiment of the present invention, the pipehead includes a die pin means having a central bore for receiving a flow of plasticized material from suitable plasticizing and pressurizing apparatus and furcating means, for separating the flow into a plurality of streams and directing the streams radially outwardly. By providing the furcating means internally of the die pin means, pressure forces from the material are reacted directly by the die pin means thereby eliminating the need for fasteners capable of reacting large forces and permitting the die pin means to be lighter and to be fabricated from cheaper materials than heretofore practical.

A die body means is coaxially positioned with respect to the die pin means such that a blind annular channel is defined therebetween. The channel terminates in a die opening and includes a constricted annular area. At the blind end of the channel, flow laminating means is provided to recombine the streams of plasticized material into a laminated flow having generally annular strata or laminae.

In this manner, the streams are recombined such that large surface areas contact one another to enhance adhesion therebetween. As the annular flow moves through the annular channel toward the die opening, the constricted annular area exerts shearing forces on the flow and squeezes the laminae together to ensure radial adhesion and thereby substantially improve structural isotropy. The constricted area is effective to control back pressure on the flow laminating means and the plasticizing apparatus and to control potential high temperature problems which might cause polymer discoloration.

The die pin means preferably includes a substantially empty internal cavity for improving the transient thermal response thereof. Moreover, by providing internal heating means for the die pin means and external heating means for the die body means, effective temperature control of the plasticized material passing through the pipehead is possible.

In another preferred embodiment of the present invention, the pipehead is provided with breaker means across the annular channel between the flow laminating means and the constricted area for splitting the annular flow of material into a multiplicity of filaments which recombine and pass through the constricted area. The breaker means is particularly suitable for use with polymeric materials which readily recombine.

When variations in material throughput rate, temperature or rheological composition occur, there is sometimes a possibility that weld lines may result from the flow lamination means. By using the breaker means, the recombination of the multiplicity of filaments downstream of the flow laminating means is effective to substantially eliminate those weld lines as visual imperfections.

DESCRIPTION OF THE DRAWINGS

Other objects and advantages of the present invention will become apparent to those skilled in the art when the appended claims are read in connection with the detailed description of preferred embodiments and the accompanying drawings wherein:

FIG. 2 is a transverse cross-sectional view taken along line 2—2 of FIG. 1;

FIG. 3 is an elevational view of one embodiment of the die pin of FIG. 1;

FIG. 4 is an elevational view of another embodiment of the die pin of FIG. 1;

FIG. 5 is a partial view which illustrates the hole configuration of the breaker plate of FIG. 1; and FIG. 6 is an elevational view in longitudinal cross-section of another embodiment of the invention.

DESCRIPTION OF THE PREFERRED EMBODIMENT

Figure 1:
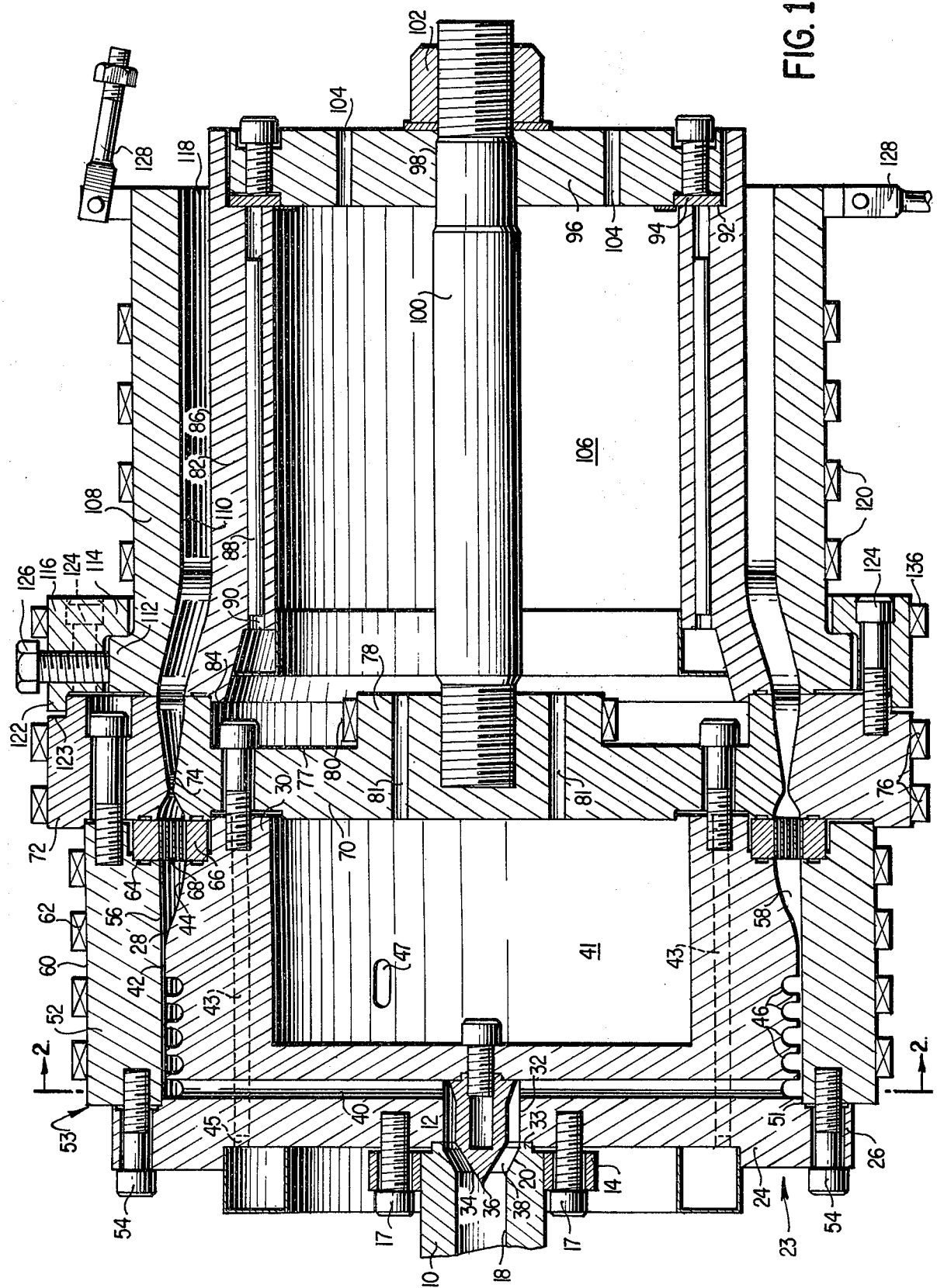
FIG. 1 is an elevational view in longitudinal cross-section of a spiral design pipehead according to one preferred embodiment of the invention.

Depicted in FIG. 1 is a spiral design pipehead according to a preferred embodiment of the invention. The pipehead includes a generally cylindrical tubular adaptor 10 having an annular projection 12 extending axially from one end and a radially outwardly extending connecting plate 14 suitably connected to one end. The adaptor 10 is provided with a generally cylindrical bore 18 which may include a countersunk portion 20 in the one end. If desired, the adaptor 10 may include a suitable band heater wrapped circumferentially around the cylindrical surface thereof.

The adaptor 10 may be suitably connected to the outlet end of a rotary screw extruder (not shown) which supplies plasticized synthetic resinous material to the pipehead. The bore 18 is preferably sized to receive a flow of plasticized synthetic resinous material directly from the extruder outlet.

Suitable fastening means, such as bolts 17, may be used to connect the connecting plate 14 to a first end of a die pin member 24 of die pin means 23 such that the projection 12 is received by a counterbore 33 to coaxially position the adaptor 10 relative to the die pin member 24. The die pin member 24 includes a generally radially extending flange 26 at the first end, a surface 28 and an axially projecting mandrel 30 at the second end. The first end of the die pin member 24 is provided with a coaxial cylindrical bore 32 which has a blind end and a diameter approximately equal to the opening of the countersunk portion 20. A flow diverting member 34 having a conical end, a generally cylindrical side and a frustoconical base, may be disposed in the coaxial bore 32 to assist in turning plasticized material received from the plasticizing apparatus. As illustrated in FIG. 1, the apex 36 of the conical end of the member 34 may project beyond the countersunk portion 20 and into the bore 18 of the adaptor 10. In this configuration, the flow diverting member 34 may also be used to define a restricted area in an annular channel 38 between the countersunk portion 20 the bore 32 and the member 34.

With continued reference to FIG. 1, the cylindrical bore 32 communicates with a plurality of generally radial ports 40 provided in the die pin member 24 which comprise a furcating means. Each radial port 40 may be gun-drilled, for example, from the surface 28 at a position near the generally radial flange 26 until the port intersects the coaxial bore 32. By referring to FIG. 2, one may readily observe ports 40 in a plane perpendicular to the axis of the bore 32 and the die pin member 24. While FIG. 2 illustrates only four radial ports for the sake of clarity, the number of radial ports 40 will generally be at least six and commonly may be eight, sixteen, twenty-four or more. The diameter of the radial ports 40 is preferably sufficient for the ports 40 to accommodate the flow of plasticized material supplied by the plasticizing apparatus.

The external surface 28 (see FIG. 1) of the die pin member 24 may include a generally cylindrical surface portion 42 and a generally frustoconical surface portion 44. The generally cylindrical surface portion 42 is provided with flow laminating means comprising a plurality of spiral or helical grooves 46 (see FIGS. 3 and 4). A spiral groove or channel corresponds to each of the plurality of radial ports 40 and includes a deep end 48 in communication with the end of the corresponding radial port 40 at the cylindrical portion 42 of the surface. Each spiral groove 46 has an arcuate region 50 in which channel depth decreases. The grooves 46 illustrated in FIG. 3 have a configuration in which the depth of each groove 46 uniformly decreases from the port 40 to the downstream end of the groove 46.

The spiral grooves 46 illustrated in FIG. 3 extend through an angle of approximately 180° measured from the axis of the die pin member 24 in a plane generally perpendicular to the axis. Depending on the base polymer used, the grooves 46 might be shorter and subtend a smaller angle such as 90° or may be longer and subtend a greater angle such as 360°.

Alternatively, each groove 46 may be fabricated with a substantial region of constant depth which communicates with the corresponding radial port 40. The region 50a of decreasing depth as shown in FIG. 4, may then comprise the last 45° of the groove by withdrawing the milling cutter when that portion of the groove 46 is reached. A groove having a region of constant depth is preferable in terms of manufacturing economy.

Returning to FIG. 1 the die pin member 24 preferably includes a large internal cavity 41 which is effective to reduce the thermal mass of the die pin 24 and to shorten the transient thermal response thereof. In addition, the die pin 24 may be provided with a plurality of conventional cartridge heating elements 43 which are disposed in equiangularly spaced bores 45 (see FIG. 2) parallel to the axis of the die pin member 24. A suitable gas passage 47 (see FIG. 1) is provided in the die pin member 24 for communication with the cavity 41 and is operable to supply pressurized gas for internal support of the extruded article as will be more fully explained.

The surface 28 of the die pin member 24 includes a generally cylindrical area 51 (see FIGS. 3 and 4) adjacent to the radial flange 26 and adjacent to the openings of the radial ports 40 in the surface 28. The area 51 serves to coaxially position a generally annular die body member 52 of die body means 53 with respect to the die pin member 24 (see FIG. 1). The die body member 52 may be secured to the radial flange 26 of the die pin member 24 by suitable fastening means such as bolts 54 and includes a generally cylindrical internal surface 56 having an axial length substantially coextensive with the external surface 28 of the die pin member 24. The diameter of the cylindrical surface 56 is slightly greater than the diameter of the cylindrical surface portion 42 of the die pin member 24. Accordingly, a portion of a blind annular channel 58 is defined between the die pin member 24 and the die body member 52.

A conventional band heater 62 may be wrapped circumferentially around an external surface 60 of the die body member 52 if desired. The downstream end of the die body member 52 includes an annular recess 64 which is approximately axially coextensive with the mandrel 30 and which is aligned radially therewith.

Positioned across the blind annular channel 58 and between the mandrel 30 and the recess 64 is a breaker means which includes an annular breaker plate 66 having a generally rectangular cross section and a multiplicity of parallel small-diameter openings 68 extending therethrough. As illustrated in FIG. 5, the openings 68 are preferably arranged in radially overlapping relationship.

The radially innermost edge of the breaker plate 66 is carried by the mandrel 30 (FIG. 1) and is secured thereto by threaded fasteners which draw a disc member 70 toward the mandrel 30. The radially outermost edge of the breaker plate is carried by the die body member 52 and is securely held in the annular recess 64 by threaded fasterners which draw a ring member 72 toward the die body member 52.

The ring member 72 and the disc member 70 are concentric, define a pair of surfaces which bound the annular channel 58 and define a region 74 of constricted or restricted cross-sectional area downstream of the breaker plate 66. Conventional band heaters 76 may be provided on the circumferential surface of the ring member 72. The disc member 70 is provided with a recess 77 that defines a mandrel-like projection 78 on which a conventional band heater 80 may be disposed. In addition, a plurality of suitable openings 81 are provided in the projection 78 of the disc member 70 so that pressurized gas in the cavity 41 may pass through the disc member 70.

In addition to the disc member 70, the die pin means 23 also includes a generally cylindrical die core 82 which is provided with a lip 84 at the upstream end thereof to concentrically position the die core 82 with respect to the recess 77 and the disc member 70.

The die core 82 includes an external surface having a cylindrical land 86 which comprises the inside diameter of the article to be extruded. In addition a plurality of equiangularly spaced bores 90 in the die core 82 receive cartridge heaters 88. The bores 90 are generally parallel to the axis of the die core 82.

The downstream end of the die core 82 has a recess 92 which receives an annular seal 94 and a generally circular push plate 96. Disposed at the center of the push plate 96 is an opening 98 which receives one end of a shaft 100 the second end of which is securely attached to the projection 78 of the disc member 70. The first end of the shaft 100 is threaded and provided with a suitable nut 102 which may be tightened thereon to provide compressive forces between the push plate 96, the die core 82 and the disc member 70. The push plate 96 also includes a plurality of longitudinal openings 104 which allow pressurized gas entering a die core cavity 106 from the openings 81 to escape into the interior of an extruded article. Suitable plugging apparatus for maintaining a pressure seal internally of the extruded article may be attached to the push plate 96 as required.

Positioned coaxially with respect to the die core 82 is a generally cylindrical die 108 having an interior surface with a cylindrical land 110 a generally radially outwardly extending flange 112 at the upstream end. The land 110 is substantially coextensive with land 86. The flange 112 is engaged by an overlapping radially inwardly extending flange 114 of a die adjustment ring 116. The cylindrical land 110 defines the external surface of the article to be extruded and, in cooperation with the cylindrical land 86 of the die core 82, defines a die opening or orifice 118 at the downstream end of the annular channel 58. The external cylindrical surface of the die 108 may be provided with conventional band heaters 120, as required.

The die adjustment ring 116 also includes an annular axial projection 122 on the upstream face thereof. The axial projection 122 is received by a mating recess 123 provided at the downstream end of the ring member 72. Suitable fasteners, such as bolts 124, may be provided to securely attach the die adjustment ring 116 to the ring member 72. In addition, radially oriented bolts 126 may be equiangularly spaced around the die adjustment ring 116 such that they bear on the radial flange 112 in order to concentrically position the die 108 with respect to the die core 82. A conventional band heater 136 may be provided circumferentially on the exterior surface of the die adjustment ring 116.

At the downstream end of the die 108, a plurality of clevis mounted swing bolts 128 may be provided to connect sizing or processing apparatus with the pipehead.

Turning now to FIG. 6, an alternate embodiment of the invention is illustrated with the subscript $a$ appended to elements analogous to those of FIG. 1. The adaptor 10$a$ is provided with a counterbore 130 at the downstream end thereof having a diameter substantially the same as the diameter of the counterbore 33$a$ in the die pin member 24$a$. The counterbores 33$a$, 130 cooperate to receive a stainless steel restrictor member 132 having a restricted flow area 134 therein. The flow area 134 may be enlarged as necessary to properly match the output of the plasticizing apparatus to the pipehead. An adjustment to the flow area 134 may be desirable, for example, when material in the rotary screw plasticizing apparatus bleeds from one channel to another of the plasticizing screw due to excessive back pressure caused by the pipehead.

One distinction between the embodiment illustrated in FIG. 1 and the embodiment illustrated in FIG. 6 is the absence of a breaker plate. Accordingly, the die core 82$a$ is provided with an axial projection 140 which is concentrically mounted on the mandrel 30$a$ of the die pin member 24$a$ to coaxially align the die core 82$a$ and the die pin member 24$a$. In addition, the die adjustment ring 116$a$ is directly secured to the die body member 52a by the bolts 124a such that the die 108a may be coaxially positioned with respect to the die body member 52a and concentrically adjusted with respect to the die core member 82a.

To maintain the die core 82a in proper position, the periphery of the push plate 96a (FIG. 6) bears on the die core 82a and the center of the plate 96a is connected to the shaft 100a which, in turn, is connected to the die pin member 24a. The shaft 100a includes a longitudinal passage 142 which communicates at one end with the cavity 41a and at the other end with several radial openings 144 of the shaft 100a. Each radial opening 144 receives a plug 146 which prevents communication with the die cavity 106a. In addition, each radial opening 144 communicates with a corresponding axial channel 148 such that pressurized gas admitted through passage 47a to the cavity 41a, the longitudinal passage 142 and the radial openings 144 may be discharged from the pipehead to the interior of an article being extruded.

The blind annular channel 58, 58a of each embodiment of this invention is preferably designed in accordance with two criteria. The first criterion is a ratio defined as the largest annulus area downstream of the spiral grooves to the annulus area of the constricted area 74, 74a. This criterion determines the amount of radial force exerted to ensure relamination of the plasticized material downstream of the spiral grooves 46, 46a. In addition, this first criterion provides a means for controlling back pressure on the plasticizing apparatus and a means for controlling polymer temperature which could result in discoloration of the finished product.

The second criterion is the ratio defined as the annulus area of the constricted area 74, 74a divided by the annulus area of the die opening 118, 118a. This second criterion is functionally related to the axial length of the lands 86, 86a, 110, 110a which, in turn, are related to the velocity of material leaving the die opening 118, 118a and provides both quality and dimensional control of the finished product.

Having described the structural features of the present invention, the operation of the pipehead in combination with an extruder to fabricate a hollow thick-walled cylindrical article of indefinite length will now be described. With the adaptor 10 (FIG. 1) suitably secured to the outlet portion of an extruder or other suitable plasticizing apparatus, plasticized synthetic resinous material will be received within the bore 18 at substantially the diameter at which the material leaves the extruder. The plasticized material will subsequently pass through the annular passage 38 and enter the cylindrical bore 32 of the die pin member 24.

At the blind end of the bore 32, the plasticized material received from the adaptor 10 is separated or furcated into a plurality of streams by the radial ports 40 which allow the material to pass radially outwardly through the pin member 24. At the radially outermost end of each radial port 40 each stream of plasticized material is discharged into the deep end of a corresponding spiral groove 46. Due to the small radial clearance between the cylindrical surfaces 42, 56, each spiral groove 46 directs the corresponding stream of plasticized material generally tangentially around the die pin member 24.

The annular space 58 between the die pin means 23 and the die body means 53, in combination with the region of decreasing depth of each groove 46, causes each stream of plasticized material to move axially with respect to the die pin member 24. In a properly designed pipehead the last portion of each stream of material in each groove 46 will turn to the axial direction at the end of the groove. With reference to the arrows 145 of FIG. 3, it will be apparent that as each stream leaves the corresponding groove 46 it provides a thin layer of material flowing axially across the adjacent downstream groove.

Accordingly, the streams of plasticized material are recombined in annular channel 58 downstream of the spiral grooves 46 into a radially laminated annular flow having a plurality of strata each of which is attributable to one of the upstream grooves 46. With the laminated flow moving axially of the die pin member 24, the flow of material enters a region of increasing area in which the plasticized material is relaxed and decompressed (see FIG. 1).

At the downstream end of the relaxation area the breaker plate 66 may be disposed. The multiplicity of small diameter openings 68 in the breaker plate 66 splits the annular flow into a corresponding multiplicity of filament-like streams of plasticized material. These filament-like streams are coalesced and recombined into a plasticized continuum upon passage through the area restriction 74 defined between the ring member 72 and the disc member 70. The area restriction exerts high shear stress for a very short time duration on the continuum of material moving therethrough.

In a properly designed pipehead, each stream will just fill the entire length of the corresponding groove. Accordingly, the radially laminated flow will be free of the visual imperfections known as weld lines. However, variations in the rheological composition of the plasticized material and thermal variations may cause the streams to underflow or overflow the corresponding grooves thereby causing objectionable visual imperfections. Since the distribution of a given polymer is highly dependent on temperature, the ability to control temperature by controlling the cartridge heaters 43, 88, and band heaters 62, 76, 80, 120, 136 provides a means for improving the rheological tolerance of the pipehead.

To further improve rheological tolerance when dealing with polymeric materials which readily adhere and recombine, the breaker plate 66 splits the annular flow into the multiplicity of filaments which are recombined into a continuum, as noted above. The application of a high shear stress to the plasticized continuum downstream of the breaker plate 66 is effective to eliminate any visual imperfections which might otherwise result from the presence of the breaker plate 66. It should be noted that there may be a hundred or more of the openings 68.

After the plasticized continuum leaves the restricted area 74, it continues through the annular channel 58 to the extruding orifice 118 defined between the cylindrical land 86 of the die core 82 and the cylindrical land 110 of the die 108. A thick-walled cylindrical article, such as a pipe, which is free from visual imperfections is thus extruded from the pipehead.

The operation of a pipehead according the the embodiment illustrated in FIG. 6 is substantially the same as the operation described above except that there is no breaker plate and the annular flow is thus not split into filaments before the die opening. In pipeheads for large diameter pipe, e.g. 24 inch diameter, the breaker plate is useful to improve tolerance. In smaller diameter pipes, however, the spiral design pipehead along with the temperature control has been adequate to improve the rheological tolerance.

When dealing with a polymeric material which does not readily adhere and recombine with itself, a pipehead according to either of the embodiments described above may be used; however, it ordinarily would be preferable to use a pipehead without a breaker plate since the resulting article would be more likely to have isotropic structural properties.

It is now apparent that there has been provided in accordance with this invention a spiral design pipehead that substantially satisfies the objects set forth above. Although the present invention has been described in conjunction with specific embodiments thereof, it is evident that many alternatives, modifications, variations and equivalents will be apparent to those skilled in the art in light of the foregoing disclosure of the invention. Accordingly, it is expressly intended that all such alternatives, modifications, variations and equivalents which fall within the spirit and scope of the invention as defined in the appended claims be embraced thereby.

I claim;

1. In an extruder pipehead for extruding thick-walled plastic pipe, said pipehead being of a type which includes a central inlet bore, a plurality of generally radial ports communicating with said bore, a plurality of helical channels communicating with said ports, a generally annular channel communicating with said helical channels and terminating in a die opening, the improvement comprising:
   breaker means for splitting the flow of plasticized material into a multiplicity of filaments being positioned across said annular channel downstream of said helical channels; and
   restricting means for creating a region of high shear stress on the filaments being provided downstream of said breaker means.

2. The pipehead of claim 1 wherein said breaker means includes an annular plate having a multiplicity of openings therethrough.

3. The pipehead of claim 1 wherein said restricting means comprises a pair of concentric members which define a reduced channel area therebetween; one member being disposed radially inwardly of the annular channel of the die assembly and the other member being disposed radially outwardly of the annular channel.

4. A rheologically tolerant die assembly for extruding a thick-walled article of indefinite length from plasticized synthetic resinous material comprising:
   die pin means having a blind bore in one end and being operable to receive a pressurized flow of plasticized material from a suitable source;
   die body means having an end carried by said die pin means such that a blind annular channel having a die opening is defined between said die pin means and said die body means;
   furcating means integral with said die pin means, communicating with said bore, and being operable to separate the flow of plasticized material into a plurality of streams;
   flow laminating means communicating with said furcating means at the blind end of said annular channel and being operable to recombine the streams into an annular flow having generally annular strata;
   filament forming means disposed in said annular channel downstream of said flow laminating means and being operable to subdivide the annular flow into a multiplicity of filaments; and
   restricting means within said annular channel downstream of said filament forming means and being operable to recombine the filaments and to provide a region of high shear stress on the plasticized material.

5. The die assembly of claim 4 wherein said furcating means comprises a plurality of generally radial ports which intersect said bore and communicate with said annular channel.

6. The die assembly of claim 4 wherein said flow laminating means comprises a plurality of helical grooves in said die pin means, each groove having a deep end in communication with said furcating means and a region in which depth decreases in a downstream direction thereby causing material flowing helically through the groove to move axially and form a generally annular stratum radially inwardly of material already moving axially from upstream portions of other helical grooves.

7. The die assembly of claim 6 wherein:
   said region of decreasing groove depth subtends an angle of approximately 45° measured in a plane normal to the axis of said die pin means.

8. The die assembly of claim 4 wherein said filament forming means includes a breaker plate disposed across said blind annular channel and having a multiplicity of radially staggered generally parallel openings therethrough.

9. The die assembly of claim 8 wherein said restricting means comprises a pair of concentric members defining a radially constricted area of said blind annular channel.

10. The die assembly of claim 9 wherein the radially outermost concentric member is carried by said die body means and the radially innermost concentric member is carried by said die pin means.

11. The die assembly of claim 4 wherein said die pin means includes a substantially empty internal cavity which is operable to reduce thermal transient response of said die pin means.

12. A rheologically tolerant head for continuously extruding a large diameter thick-walled conduit having an indefinite length from plasticized synthetic resinous material supplied under pressure by a rotary screw extruder, the head comprising:
   a die pin having two ends, a blind coaxial bore in one end, a generally cylindrical surface, a plurality of generally radial ports communicating with said coaxial bore and with said cylindrical surface, and a corresponding plurality of helical grooves in said cylindrical surface which communicate with said ports;
   a core member carried by the second end of said die pin and having an internal cavity which is operative to improve thermal response characteristics of said core member;
   a die body coaxially carried by said die pin; defining a blind annular channel with said die pin;
   a die member coaxially disposed about said core member such that a blind annular channel having a die opening and a constricted area is defined between said die pin, said core member, said die body, and said die member;

concentricity adjustment means carried by said die body and being operable to position said die member coaxially with respect to said core member;
internal heating means carried internally of said die pin and said core member and being operable to control the temperature thereof; and
external heating means carried circumferentially by said die body and said die member and being operable to control the temperature thereof.

13. The head of claim 12 including:

a breaker plate having a multiplicity of openings therethrough and being disposed across said annular channel downstream of said plurality of helical grooves; and
said radially constricted area of said annular channel being provided downstream of said breaker plate, whereby the head is rendered more tolerant of different rheological compositions.

* * * * *